United States Patent
Gebhardt

(12) 
(10) Patent No.: US 6,331,207 B1
(45) Date of Patent: Dec. 18, 2001

(54) METHOD OF TREATING CEMENT KILN DUST FOR RECOVERY AND RECYCLE

(76) Inventor: Ronald Frank Gebhardt, 6253 Venture Ct., Slatington, PA (US) 18080

( * ) Notice: Subject to any disclaimer, the term of this patent is extended or adjusted under 35 U.S.C. 154(b) by 0 days.

(21) Appl. No.: 09/247,903

(22) Filed: Feb. 10, 1999

(51) Int. Cl.$^7$ ............................... C04B 7/24; C04B 7/26

(52) U.S. Cl. ............................................ 106/751

(58) Field of Search ...................... 106/707, 751, 106/745

(56) References Cited

U.S. PATENT DOCUMENTS

| | | |
|---|---|---|
| Re. 33,031 | 8/1989 | Morrison . |
| 1,307,920 | 6/1919 | Nestell . |
| 2,329,940 | 9/1943 | Ponzer . |
| 2,871,133 | 1/1959 | Palonen et al. . |
| 2,991,154 | 7/1961 | Patzias . |
| 3,929,968 | 12/1975 | Taub . |
| 4,031,184 | 6/1977 | McCord . |
| 4,195,062 | 3/1980 | Martin . |
| 4,219,515 | 8/1980 | Helser et al. . |
| 4,402,891 | 9/1983 | Kachinski . |
| 4,716,027 | 12/1987 | Morrison . |
| 4,915,914 | 4/1990 | Morrison . |
| 5,173,044 | 12/1992 | Neilsen . |
| 5,264,013 | 11/1993 | Brentrup . |
| 5,792,440 | 8/1998 | Huege . |

OTHER PUBLICATIONS

US EPA, "Development Document for Effluent Limitations Guidelines and New Source Performance Standards for the Cement Manufacturing Category," EPA 440/1–74–005–a, Jan. 1974, pp. 54–62, 79.

*Primary Examiner*—Paul Marcantoni

(57) ABSTRACT

Fresh or stockpiled cement kiln dust is moistened with sufficient water so that the amount of total free and combined water relative to dust is about 3 parts water to 1 part dust by mass, or less. The wet solids are treated with carbon dioxide to convert compounds, such as calcium hydroxide, to carbonates, such as calcium carbonate. The degree of carbonation is controlled so that the solubility of calcium becomes minimum for the dust being treated; this is also when hydroxyl and bicarbonate ions in solution are about at their minima. As the carbonation reactions occur, the water combined in hydroxides is released as free water so that the mixture becomes a slurry and the potentially soluble alkalies and sulfate (and any chlorides present) are released to the liquid phase. The solids are separated from the liquid, and the solids, which may be washed, provide a material suitable for return as feed to the kiln. The liquid, which contains the dissolved alkali compounds, is recycled to reclaim additional dust or treated to recover alkali salts when the alkali salts are sufficiently concentrated.

While any source of carbon dioxide may be used, the preferred source is exit gases from the kiln. The gases are conditioned by condensation of water and removal of ammonium compounds, such as sulfate and chloride. The conditioning condensate may be treated to recover useful byproduct salts.

19 Claims, 4 Drawing Sheets

CEMENT KILN DUST RECOVERY AND RECYCLE SYSTEM

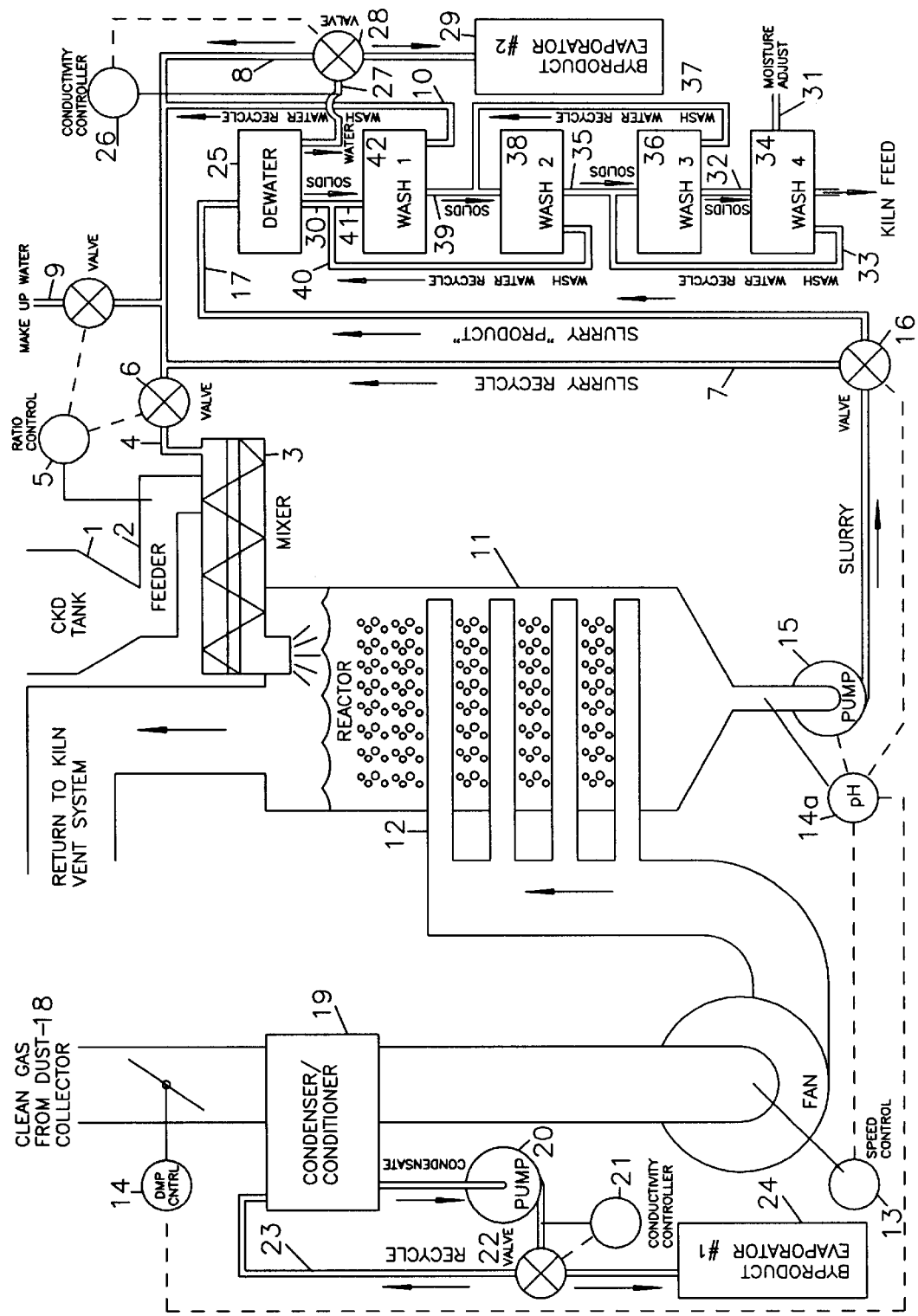
FIG. 1 CEMENT KILN DUST RECOVERY AND RECYCLE SYSTEM

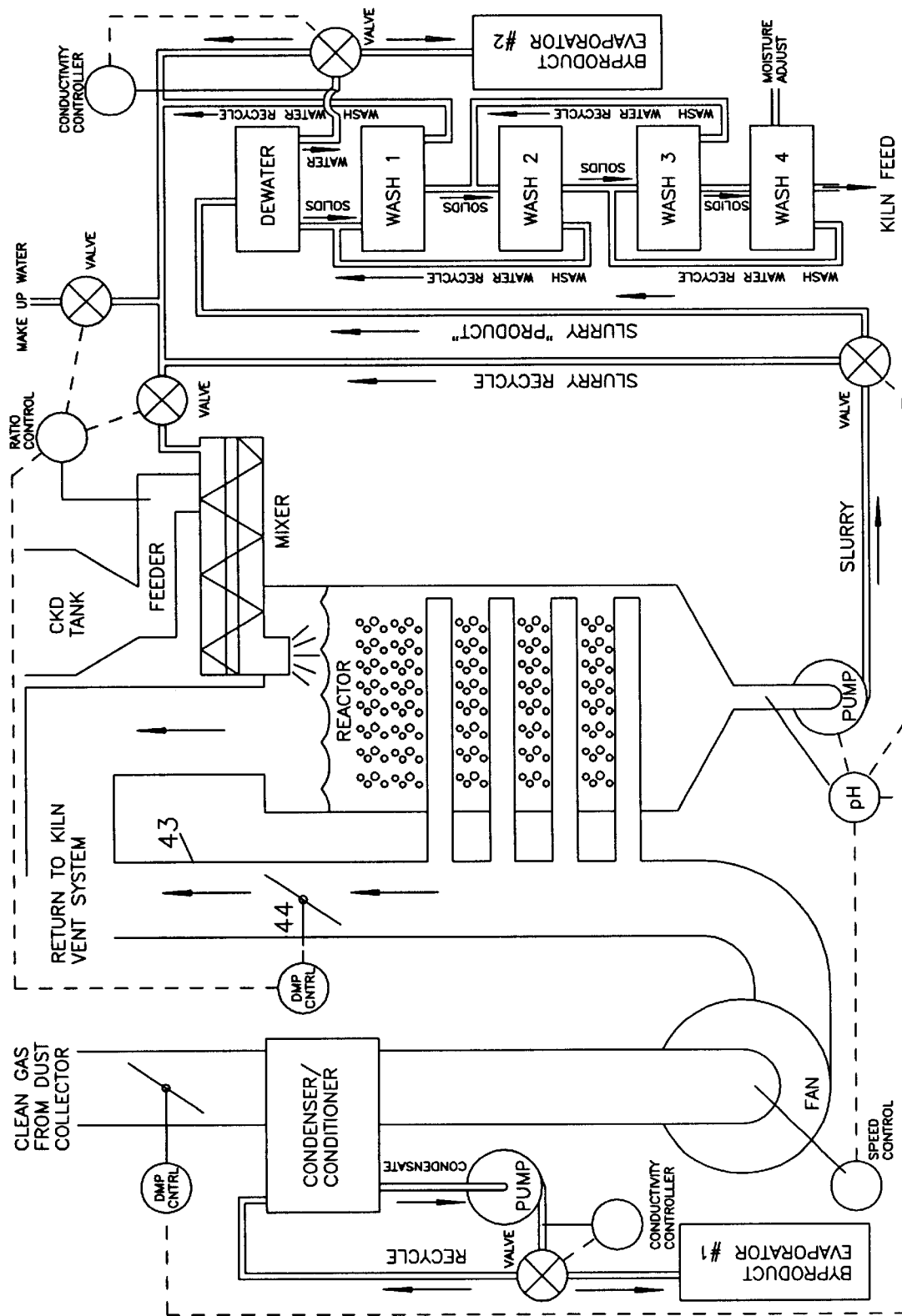
FIG. 2 CEMENT KILN DUST RECOVERY AND RECYCLE SYSTEM

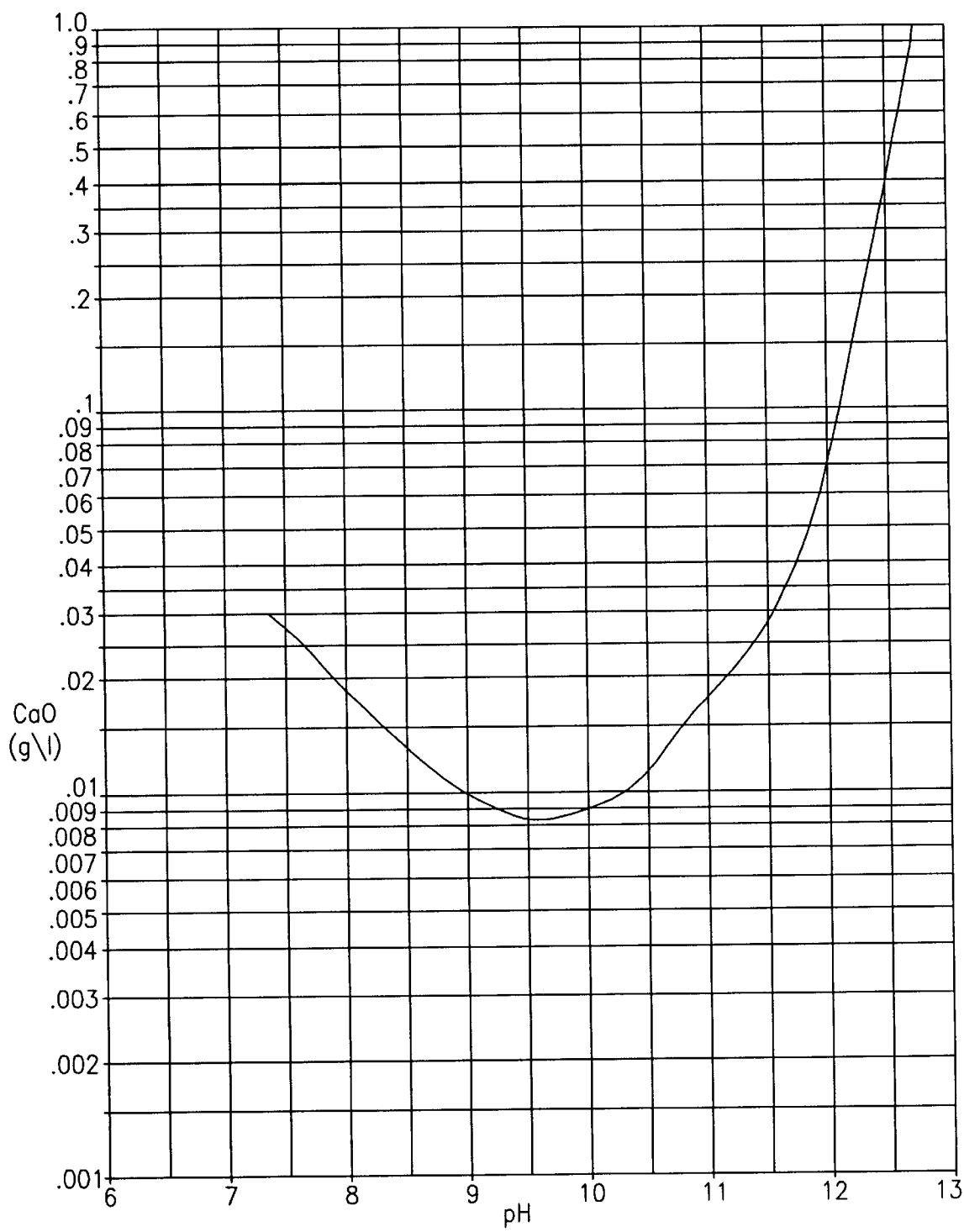
FIG. 3  Ca(OH)2 + CO2

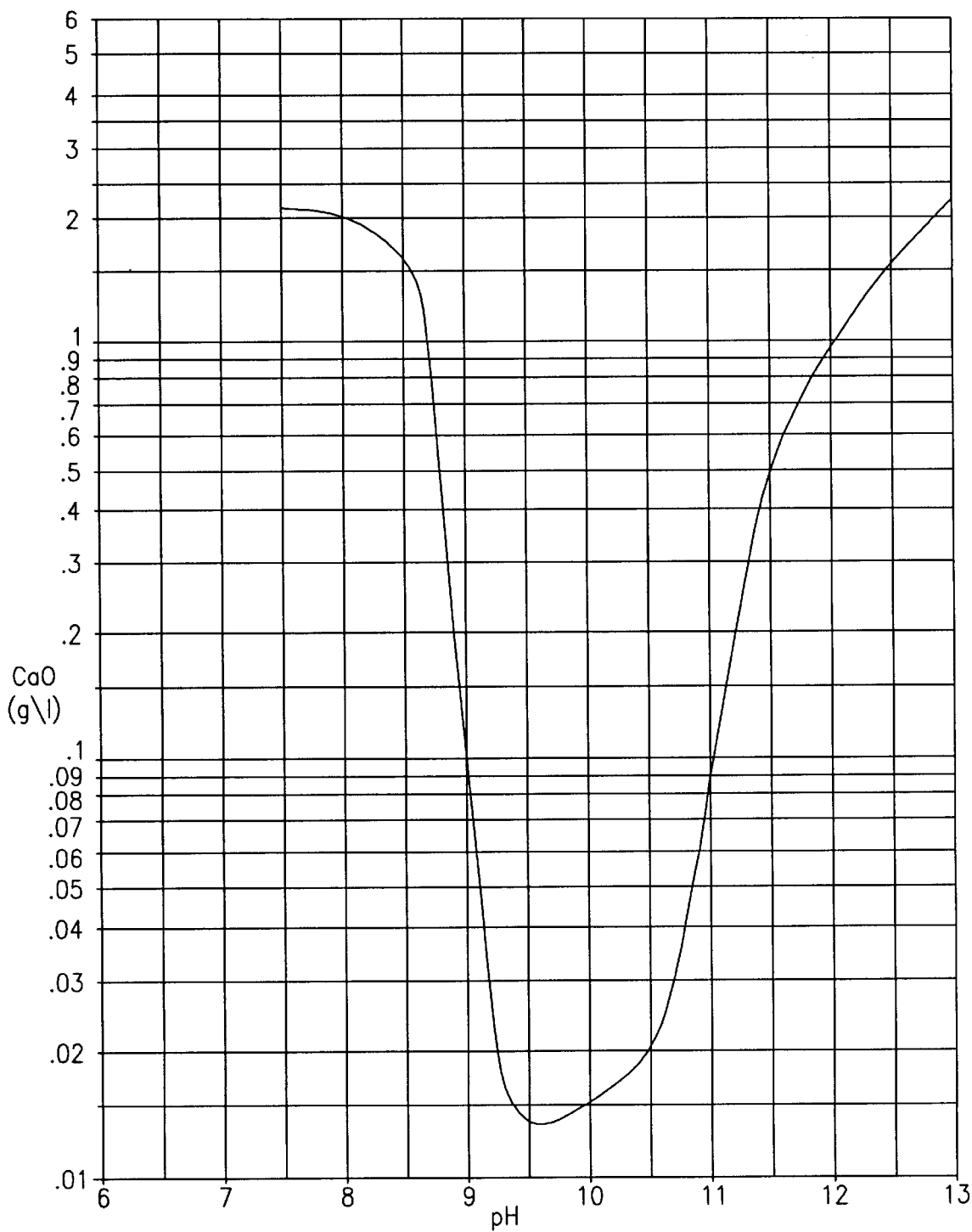
FIG. 4 KILN DUST + CO2

METHOD OF TREATING CEMENT KILN DUST FOR RECOVERY AND RECYCLE

FIELD OF THE INVENTION

This invention deals with the reclamation and treatment of cement kiln dust (CKD) so that it may be used as feed in the clinker-producing process.

BACKGROUND OF THE INVENTION

CKD is the particulate matter carried from the feed end of a cement (clinker-producing) kiln (industrial furnace) by the exhaust gases resulting from combustion and calcination. CKD typically consists of particles of raw materials, partly to wholly calcined raw materials, reaction process intermediates, fine clinker, and inorganic fuel solids; it usually also includes condensates and reaction products from the inorganic raw material and fuel volatiles.

A particular CKD can vary in composition (see Table 1) from virtually unaltered kiln feed (raw meal) to over 90% alkali sulfates and chlorides (Haynes and Kramer, "US Bureau of Mines Circular 8885," 1982; and personal observation), depending on process type, kiln configuration, raw materials, fuel(s), process characteristics, and point(s) of collection. It can vary in particle size from that of fine sand or silt to that of clay, with particle size distribution ranging from very broad to very narrow depending on material and process parameters.

TABLE 1

ANALYSES SHOWING EXTREMES OF CKD COMPOSITION
(Relative to Kiln Feed)

| OXIDE | MINIMUM CHANGE* | MAXIMUM CHANGE |
| --- | --- | --- |
| $SiO_2$ | 12.11 | 1.07 |
| $Al_2O_3$ | 4.44 | 0.28 |
| $Fe_2O_3$ | 1.44 | 0.24 |
| CaO | 47.29 (43.0) | 2.19 |
| MgO | 1.08 | 0.10 |
| LOI | 35.00 | 1.50 |
| $Na_2O$ | 0.12 | 4.36 |
| $K_2O$ | 1.54 | 43.31 |
| $SO_3$ | 1.15 | 45.96 |
| Total | 103.77 | 99.01 |

*Analysis #63 in Haynes and Kramer. The total indicates this analysis to be of low quality. CaO analysis is higher by about 5% and $SiO_2$ lower by about 2% relative to typical expectation for kiln feed.

The quantity of dust generated from a particular kiln depends on the factors noted above as affecting composition and particle size, the internal configuration of the kiln, the quantity of gases passing through the kiln, and other operating conditions. In general, the amount of dust generated from a kiln system ranges from about 5% to over 20% of kiln feed, with an average "emission factor" of around 12% ("Emission Factors for Industrial Processes," EPA publication AP-42) of clinker produced; EPA indicates relatively little dependence upon process types.

United States clinker capacity of 75 to 80 million tons per year has remained relatively steady for the past 20 years ("US and Canadian Portland Cement Industry: Plant Information Summary, December 1995"; Portland Cement Association, Skokie, Ill., November 1996). Applying the EPA Emission Factors suggests that about 9 to 10 million tons of CKD are generated per year; that about 300 million tons have been generated over the past 30 years; and that over 1 billion tons have been generated since the start of the US cement industry over a century ago.

Kiln dust is a major problem at many cement manufacturing plants. Dust is generated in large quantities and is often not suitable for direct return to the cement-producing process as a feed, except in relatively small amounts, often because of high concentrations of alkalies and sulfates, because of incompatibility of the dust with the process, or because of limitations of the process equipment. It is estimated that less than half of the dust generated each year is returned to the process. (Some plants return all of their dust while others return none of it.) Since large quantities of dust cannot be returned directly to the kiln in all cases, that material must be disposed in some manner. Beneficial uses have been suggested, but the amounts of dust so used are relatively small. For some uses, only a few dusts are acceptable, while for others, such as agricultural liming, use is seasonal, but generation is continuous. Frequently, dust that cannot be directly returned or reused is discarded in waste piles, or it may be placed in land- or quarry-fills. Such disposal methods are inherently unsatisfactory because they involve wasting a material for which significant processing and handling costs and effort have been incurred. In addition, as environmental regulations have matured, the costs and problems of disposal have become more onerous, and continued disposal of kiln dust has become ever less desirable and more expensive.

PRIOR ART

The problems relating to CKD have long been recognized, and various methods have been proposed for their solution. Methods proposed by prior art have had one or more goals such as:

kiln dust recovery for reuse;

kiln dust utilization for other purposes;

byproduct recovery; and pollution control.

One method suggested by prior art for treating cement kiln dust is to leach the dust with water to remove alkalies. Such procedures have been used in the past and have suffered from several problems:

only part of the alkalies were readily soluble, often half or less;

typical ratios of water to dust were 10:1 to 20:1, or higher;

an effluent high in pH (>10) and dissolved solids was discharged;

dissolved solids tended to precipitate in the receiving waters;

the high pH effluent was detrimental to the biosphere;

the recovered solids were high in water content, often over 70%; and adjustments to kiln feed chemistry were required when treated dust was returned to the kiln.

These problems were so severe that the leaching methods of the past were largely banned by the US EPA by virtue of effluent limitations that were unachievable [see "Development Document for Effluent Limitations Guidelines and New Source Performance Standards for the Cement Manufacturing Category." US EPA, January 1974]. Most leaching processes were shut down in the late 1970's and early 1980's, with the last one being discontinued in August of 1998. With that closure there are, to my knowledge, no commercially viable reclaim and recycle facilities for CKD in the United States, suggesting that there may actually be no relevant prior art.

Another method for treating cement kiln dust is described in Patzias (U.S. Pat. No. 2,991,154, July 1961) wherein kiln dust is mixed with water in a ratio of 2.5 to 3 parts water to 1 part dust, with the resulting mixture heated to about 358° F. in a closed vessel at a pressure of 150 psi for about 30 minutes. The slurry is then filtered to separate the solution containing the alkalies from the residual solids; the separated solution is treated by neutralization with sulfuric acid, evaporation, centrifugation, or a combination thereof, to recover alkali sulfates. The residual kiln dust solids are recycled to the cement-making process (with no indication of further treatment after alkali removal). This process is not practical for a number or reasons. Water is used in high ratio to dust, high temperature and high pressure (rather than carbonation) are used to effect the dissolution of alkalies, and significant amounts of calcium will be dissolved. Kiln dust solids would differ significantly in composition from normal kiln feed (requiring kiln feed correction). The residual solids could be returned to some kiln processes, but they would not be suitable for all processes and the amounts returnable would often be limited.

Similarly, McCord (U.S. Pat. No. 4,031,184, June 1977) leaches CKD at high temperature (but not at high pressure), using potassium chloride (KCl) to enhance solubility, and then flocculates the CKD solids using oil and a fatty acid and pelletizes the precipitate for reuse. The KCl is partly precipitated by cooling, making use of the large difference in solubility of KCl in hot and cold water. In all probability, the inventor has misidentified the chemical species that precipitates. The Haynes and Kramer survey of 113 US cement kiln dusts (i.e. most of those produced in the United States) indicates only 11 dusts where the sulfate does not exceed the chloride by at least two orders of magnitude (i.e. by at least a factor of 100). Even in those 11 dusts, sulfate exceeds chloride by a factor of two to five. Since the solubility of potassium chloride is higher than that of potassium sulfate by more than a factor of two in both hot and cold water, it is much more likely that any precipitate will be potassium sulfate rather than potassium chloride.

Palonen, et al. (U.S. Pat. No. 2,871,133, January 1959) describes a process wherein CKD is agglomerated at high pressure and then heat treated at a temperature of at least 1000° F. (538° C.) to render the alkalies more soluble. The resulting heat-treated agglomerate is then leached with water (dust to water ratios varying between 5:1 and 1:50) to remove the solubilized alkalies. The residual solids are further treated to adjust moisture for return to a cement kiln, while the alkali-bearing leachate byproduct is offhandedly referred to as possessing "valuable chemical properties which permit its subsequent use in fertilizer manufacture" even though it may be very dilute. This process suffers because it is very complicated. The dust must be agglomerated in some manner using high pressure (up to 10,000 psi), often with some chemical binder ($CaCl_2$, clay, etc.) and must then be heat treated at a temperature exceeding 1000° F. in a kiln or furnace that will require additional fuel or electric power for heating. The heat-treated agglomerate must then be leached (perhaps requiring pre-crushing to enhance leaching rate). The leached agglomerate must then be prepared for return to the clinkering process by drying, crushing, grinding, and blending.

Another method for treating cement kiln dust is described by Nestell (U.S. Pat. No. 1,307,920, June 1919). The process is described as mixing kiln dust with water and passing carbon dioxide into the resulting mixture to substantially neutralize the slurry. The resulting neutralized slurry is then evaporated to produce a solid material suitable for use as a fertilizer component. The primary intent, obviously, is to neutralize the free lime present so that "burns" from lime to people and crops are avoided. The product of this process could not be recycled back into the cement kiln and used as a kiln feed material unless the alkali levels of the original dust were very low, i.e. <5%. Agricultural use of the material so produced would be seasonal, while generation of dust is continuous.

Still another method of treating kiln dust with carbon dioxide is described by Ponzer (U.S. Pat. No. 2,329,940, September 1943). In this patent, cement kiln dust is used as an ingredient of a raw mix slurry in a wet-process cement plant. The object of this invention is to improve the handling characteristics of slurry kiln feed by inhibiting the tendency of kiln dust to increase the viscosity of clay-containing raw mix slurry or to cause it to gel. The patent states that dust can be reused by this method only up to 3% of dry solids; it is, thus, of limited value for the typical cement kiln process which generates dust as about 11% of kiln feed (US EPA, AP-42). The invention uses a high ratio of water to dust (3:1) and indicates no awareness of even the presence of ammonium ions in kiln exit gases, let alone the adverse effects of ammonium salts. The large-volume effluent (excess water) receives no consideration; it apparently is simply discharged. This process is one that was effectively banned by US EPA. Also, it would not be usable for dry-process kilns or preheaters and would not be useful with high-alkali dusts.

Kachinski (U.S. Pat. No. 4,402,891, September 1983) adds water to CKD in a carbon dioxide atmosphere to reduce the alkalinity of the resulting wet dust and to aid pelletizing for use of the material as a fertilizer. Alkalies are not removed, and the material is not suitable for return to a cement-making process.

Kachinski cites Helser, et al (U.S. Pat. No. 4,219,515, August 1980) which adds carbon dioxide to waste water from the production of hydrous calcium silicates from lime and silica in order to remove calcium from the water so that it can be recycled to the production process. The resulting calcium carbonate precipitate presumably can be re-calcined to produce lime.

Huege (U.S. Pat. No. 5,792,440, August 1998) uses carbon dioxide to treat a supernatant liquid after leaching (and separation of the solids) from lime kiln dust in order to produce (high purity?) precipitated calcium carbonate as a separate product.

Carbonation has also been used in the past in some processes to neutralize the pH of a fluid effluent prior to discharging the dust slurry into a stream or lagoon. Such a material-handling technique is described in "Development Document for Effluent Limitations Guidelines and New Source Performance Standards for the Cement Manufacturing Category." This method is only useful as effluent control and does nothing to enhance the ability to return dust to the process. It also fails to even mention the existence of ammonium compounds in kiln exit gas.

Another method to treat CKD with kiln gases is described in Morrison (U.S. Pat. No. 4,915,914, April 1990, and U.S. Pat. No. 4,716,027, December 1987, [reissued as U.S. Pat. No. RE 33,031, August 1989, with 15 additional claims]) apparently developed under a US Department of Energy Grant for Clean Coal Combustion Technology, in which the primary purpose is stated to be scrubbing of sulfur oxides from cement kiln stack gas, with almost incidental claims of recovering kiln feed and byproducts; later claims indicate dust recovery for reuse and production of an alkali byproduct for fertilizer to have become other primary goals. A plant-scale version of this process was constructed and operated at a wet-process plant. Apparently it would scrub stack gases, at least partly, and dust was returned to the kiln, but the claimed alkali byproduct was not recovered, even after several years of operation. The process was operated during the tenure of the inventor at the facility but was shut down and abandoned fairly soon after his departure. Efforts over several years to market the process were unsuccessful; it was too large, too capital intensive, operationally too inefficient, and of limited applicability (wet-process plants only). Further, there was a large effluent discharge. The process also was not successful because it was misapplied in a plant whose dust did not require treatment for return. As written, the process could not be applied by one of average skill in the art, while one highly skilled in the art would recognize that the process demonstrates inadequate understanding of the various cement kiln processes; clinker, kiln feed and kiln dust chemistry; chemistry of stack gases; combinations thereof, and materials handling.

Specifically, the process of the Morrison patents scrubs and condenses kiln stack gases (another version scrubs coal-fired boiler and combustor stack gases), uses the contaminated condensate to produce a slurry at a high water to dust ratio, exercises no control over degree of carbonation, and takes no account of the ammonium compounds that are present in large quantities; the resulting thin slurry is then settled in a thickener, without washing, to produce a high water content slurry for return to the cement kiln, an alkali-bearing supernatant liquid overflows the thickener and is returned to the condenser for evaporation. The process steps used produce mutually contaminated products. Dust treated with this process has not had maximal removal of alkalies, nor have characteristics of the kiln dust solids been optimized for return to the specific kiln process. Also, the thermal requirements for evaporation and crystallization are ignored, as are actual reactions that occur among kiln dusts, water, and stack gases. For these reasons, and others not specifically listed, the process described in that invention is just not practical.

The Morrison patents are variations on a theme of wet scrubbers (particularly using lime and limestone) and flue gas desulfurization that was common in the 1970's and 1980's. Examples include Martin, et al. (U.S. Pat. No. 4,195,062, March 1980) which reinjects partly cleaned, low pH water from a reaction tank to the FGD spray tower with the solids becoming a waste stream, and Taub (U.S. Pat. No. 3,929,968, December 1975) which uses an inorganic salt solution to scrub $SO_2$ from stack gases, with the salt selected to control pH.

Later than Morrison, Neilsen (U.S. Pat. No. 5,173,044, December 1992) uses a wet-process (cement raw mix) slurry (combined with CKD or fly ash) to scrub sulfur from kiln gases and retain them in the kiln. This process is of limited applicability because it retains all of the alkalies in the kiln so that, in the majority of cases, only limited amounts of CKD can be used.

Brentrup (U.S. Pat. No. 5,264,013, November 1993) considers ammonium compounds and their removal from kiln stack gases after the gases have been dedusted (particulates removed) by a conventional dust collector. Removal of ammonium compounds is effected by "a carbonaceous filter medium" (e.g. activated carbon). CKD collected in the conventional dust collector is later progressively heat-treated to "volatilize low-boiling pollutants" and collect them with the carbonaceous filter medium. This invention does nothing to enhance the ability to return CKD to the cement-making process.

OBJECTS AND ADVANTAGES OF THE INVENTION

It is an object of the present invention to reclaim and treat cement kiln dust for introduction to a clinker-producing process by maximal removal of alkalies and sulfate and by conditioning the dust so that it is compatible with the process to which it will be introduced. It is a further object of the invention that the process not interfere with manufacture of the primary products of the facility. It is a further object of the invention that the treatment process be adjustable for the characteristics of the kiln(s), dust(s), gas(es), and water source(s) at any particular facility. It is a further object of the invention to recover byproduct chemicals of purity acceptable to typical markets for chemicals of the same generic class. It is a further object of the invention that there need be no liquid effluent discharge and that the treatment process be within the environmental requirements for the subject facility.

It is a feature of the preferred embodiment of the process of the invention that virtually all of the soluble alkalies and sulfates may be removed from the cement kiln dust. The beneficiated dust may then be returned to the cement-making process, thereby providing a source of kiln feed for making clinker. Since large quantities of dust may be recycled back into the cement-making system as a raw material, major savings in processing costs will occur. It is a particular feature of the process of the invention that such improvements may be experienced because:

1. the carbonation forces the precipitation of $CaCO_3$ and ties up the available calcium present in the dust, thereby greatly reducing the formation of syngenite [$K_2Ca(SO_4)_2.H_2O$] and gypsum [$CaSO_4.2\ H_2O$] precipitate, which would otherwise contaminate the residual solids intended for use as kiln feed;
2. the removal of the alkali sulfates from the kiln dust enables the original oxide composition of the dust to be retained for use as a kiln feed material, since the calcium originally present in the dust is tied up and retained as a solid in the form of $CaCO_3$;
3. scale formation on equipment is minimized, since the dust particles serve as nucleation centers and/or precipitation sites for the calcium carbonate formed during carbonation;
4. the water requirement for leaching is greatly reduced relative to other processes;
5. it produces a non-polluting brine and a conditioner condensate from which useful byproducts can be recovered; and
6. through rapid separation of the brine from the kiln dust solids, hydration of hydraulic clinker compounds is minimized.

Advantages of the invention include its applicability to any kiln dust (whether fresh or aged) for which treatment is desired for introduction to a clinker-making process, its compatibility with the clinkering processes, its self-contained nature, its ability to maximize use of on-site resources, and its ability to recover valuable byproducts. When it is desired to return dust as it is generated, only about 5% of kiln exit gas need be conditioned to provide required treatment of the dust; a plant using only recovered dust as kiln feed would need about 60% of kiln exit gases. Necessary equipment is easily scaled to the requirements of a particular plant. Capacity may need to be only a few hundred gallons and a few thousand ACFM of gas for a smaller cement plant processing only its own fresh dust, capacity may need to be much larger for a large cement plant or a facility processing large amounts of aged dust. Kiln dust product for return to the clinkering process will be chemically and physically compatible with the normal kiln feed for the given process. The invention need have no effluent nor impose added environmental requirements on a facility, it reduces emission of greenhouse gases by collection of certain chemical species during conditioning of kiln gases and by their conversion to valuable byproducts; and it allows manufacture of products from essentially all of the raw materials calcined. It can minimize the need to waste kiln dust from most cement plants, thus eliminating the monetary and environmental costs of disposal and maximizing utilization of raw materials and fuels.

It will be obvious to anyone skilled in the art that the invention is also applicable to lime kiln dust.

It will be obvious to anyone skilled in the art that materials of construction must be chemically compatible with the characteristics of the materials being processed.

DRAWINGS AND FIGURES

FIG. 1: Block diagram showing the primary embodiment of the invention.

FIG. 2: Block diagram showing an alternative embodiment of the invention.

FIG. 3: Graph showing dissolved CaO vs. pH for a "simplified kiln dust."

FIG. 4: Graph showing dissolved CaO vs. pH for an actual kiln dust.

LIST OF REFERENCE NUMERALS ON DRAWINGS

1. Kiln dust bin.
2. Kiln dust feeder.
3. Mixer.
4. Water line.
5. Controller for water source and amount.
6. Water valve.
7. Slurry recycle line.
8. Brine recycle line.
9. Make-up water line and valve.
10. Wash water recycle line.
11. Reactor.
12. Carbon dioxide bubblers (spargers).
13. Fan and speed controller.
14. Kiln gas inlet control damper.
14a. pH sensor and reaction controller.
15. Reactor discharge pump.
16. Slurry recycle control valve.
17. Slurry line to dewatering.
18. Kiln gas duct.
19. Kiln gas conditioner.
20. Kiln gas conditioning condensate pump.
21. Conductivity controller.
22. Condensate recycle valve.
23. Condensate recycle line.
24. Condensate evaporator.
25. Dewatering device.
26. Brine recycle controller.
27. Brine line.
28. Brine recycle valve.
29. Brine evaporator.
30. Dewatered solids.
31. Clean wash water and moisture adjustment of returned solids.
32. Solids from stage three washing.
33. Recycle water from stage four washing.
34. Stage four washing.
35. Solids from stage two washing.
36. Stage three washing.
37. Recycle water from stage three washing.
38. Stage 2 washing.
39. Solids from stage 1 washing.
40. Recycle water from stage one washing.
41. Solids from dewatering.
42. Stage 1 washing.
43.* Return duct for excess conditioned kiln gas.
44.* Control damper for return of excess conditioned gas.
*on FIG. 2 only.

SUMMARY OF THE INVENTION

Cement kiln dust from a selected source is moistened with water and then reacted with carbon dioxide to convert calcium oxide and hydroxide to calcium carbonate; any source of carbon dioxide may be used, but conditioned kiln exit gases are the preferred source. Degree of reaction is controlled by pH so that retention of calcium and removal of alkali compounds are maximized. When the pH is at optimum, the kiln dust solids are separated from the brine and the interstitial water displaced by multiple washing so that amount of alkalies remaining with the dust is minimized. The kiln dust solids are returned to an appropriate location in the clinker-making process after adjustment of moisture content, if necessary. The alkali-containing brine, separated from the kiln dust solids, is treated to recover a byproduct of alkali compounds. Condensate from conditioning of kiln exhaust gases is retained separately and treated to recover a byproduct of ammonium compounds.

Novel aspects of this invention for treating cement kiln dust include leaching the dust with water and forming a slurry having a dust to water ratio of below 1:2; passing carbon dioxide into the slurry to precipitate calcium carbonate and allow dissolution of alkali salts; and separating the slurry into solids and an alkali-sulfate brine when the concentrations of calcium, hydroxyl, and bicarbonate ions in the slurry are near minimum. This is accomplished by controlling the pH of the reacted slurry to be within a range of about 8 to 11 pH units, preferably 9.0 to 10.0, and specifically 9.5 pH units for many typical dusts, but with the actual control pH for any given dust determined by tests with that dust to establish the pH at which minimum solubility of calcium occurs. Use of pH control allows metering of the amount of carbon dioxide required for the reactions that minimize the solubility of calcium and maximize the solubility of alkalies; this, in turn, allows minimization of the amount of carbon dioxide required for the reactions which, when kiln exhaust gases are used as the source of carbon dioxide, minimizes the amount of kiln gases that have to be conditioned. The selected control range represents minimum solubility for calcium and minimum concentrations of both bicarbonate and hydroxyl ions in solution; this range enhances the solubility of the alkalies present in the dust and maximizes their removal. Other novel aspects of this invention include use of conditioned kiln gases as a source of carbon dioxide to treat the slurry, wherein conditioning removes chemical species deleterious to precipitation of calcium carbonate and to dissolution and precipitation of alkali salts, treatment of the conditioning condensate to produce a byproduct of ammonium salts; dense-phase washing of brine from the solids; and treatment of the brine to produce a commercially valuable alkali-sulfate byproduct. Other novel aspects include compatibility with, and adjustability of, the invention to the characteristics of all kiln process types, kiln dust source(s), kiln gas(es), water source (s), and environmental requirements.

DESCRIPTION OF THE INVENTION

In the description that follows, the numbers given refer to those shown on FIG. 1, attached.

Kiln dust from the source(s) selected (dust collectors, storage tanks, storage piles, landfills, etc.) is metered from a CKD bin [1] by a feeder [2] to a mixer [3] where it is mixed with water [4] in controlled amount via a controller [5] and valve [6] such that the ratio of dust to water is greater than 1:2 and preferably in the range of about 2:1 to 4:1, depending on the desired process temperature and the characteristics of the dust. The source of the water may be recycled slurry [7], dewatering brine [8], make-up water [9] (whether fresh or runoff catchment) in addition to Wash 1 recycle [10]. The resulting mixture, at this point in the form of a damp solid wherein free calcium oxide has been converted to calcium hydroxide, is placed in a reactor [11] where cleaned, carbon dioxide-containing kiln gases [12] are metered through the reactor by control of fan speed [13], damper position [14], or both. As the carbon dioxide reacts with the calcium hydroxide to produce calcium carbonate, free water is released converting the damp solid into a slurry. Degree of reaction is monitored and controlled [14a] by pH of the slurry which can be used to control flow of carbon dioxide reactant [via 13 and 14], feed rates of dust and water [2, 3, and 4], exit flow rate from the reactor [15], and direction [via valve 16] to slurry product [17], slurry recycle [7], or a selected ratio of both. Control of pH is to the proper value for the dust being treated, as determined by testing, that minimizes concentrations of $Ca^{++}$, $OH^-$, and $HCO_3=$ in the brine at the operating temperature.

If the slurry exiting [15] the reactor is at non-optimum pH, it is recycled [7] back to the reactor for further treatment; pH is lowered by further reaction with carbon dioxide or raised by reaction with new dust. When pH is in the optimum range, it may be recycled [7], if process needs dictate, or it may be directed [17] to product dewatering [25]. Product dewatering [25] may use any of several well-known methods such as filtration, centrifugation, or slurry thickening; filtration would be one preferred method for process reasons that will be apparent. Depending upon the conductivity [26] of the brine [27] separated from the solids, control valve [28] directs the brine to recycle [8], to byproduct recovery Unit #2 [29], or apportions it between both. For byproduct recovery, the stream of brine may be evaporated to dryness using the dry vent-gas from a clinker cooler, cooled to precipitate a portion of the salts contained therein, with the cooled brine returned to the conditioner; treated by reverse osmosis to recover clean water and further concentrate the brine, etc.; or some combination thereof. A byproduct consisting mostly of alkali sulfates, with some other salts, will be recovered for sale or disposal.

The dewatered solids [30] are washed to remove the brine, preferably using just enough wash-water to displace the interstitial brine in the solids (dense-phase displacement washing). Several stages of washing are used, with a minimum of three and preferably four stages. In each stage, the water displaced from the solids in the following stage is used to displace the interstitial water in the preceding stage; for example, the moisture adjustment water [31] is used to displace the interstitial water from the solids [32] in Wash 4 [34] with the displaced water [33] used as displacement water for the solids [35] in Wash 3 [36]. The water [37] displaced in Wash 3 [36] is used as displacement water in Wash 2 [38] to displace the interstitial water in the solids [39] entering Wash 2. The water [40] displaced in Wash 2 is used to displace the interstitial water from the solids [41] entering Wash 1 [42]; the displaced water from Wash 1 [10] is recycled to the reactor. By a counterflow, staged wash process, the displaced water [10] from Wash 1 will approach a concentration of dissolved solids similar to that of the dewatering brine [30]. The washed and dewatered kiln dust solids, with brine removed and washed, are adjusted for compatibility with the requirements of the process to which they are being returned.

One skilled in the art will recognize that staged washing can be done using any of several designs of filters, centrifuges, thickeners, or other devices.

The carbon dioxide reactant may be obtained from kiln stack gases [18] which are conditioned [19] to control temperature, to condense part of the water contained therein, and to remove chemical species that may interfere with the process; specifically ammonium compounds, hydrocarbons, and volatile metals (such as mercury, thallium, and lead, if present) are removed. The condensate [20], with conductivity [21] as a measure of concentration of salts and using a valve [22], is either returned to the conditioner [23], sent to byproduct recovery Unit #1 [24], or apportioned between both streams. For byproduct recovery, the stream of conditioner condensate may be oxidized or otherwise chemically treated to remove trace metals, and then may be either evaporated to dryness using the dry vent-gas from a clinker cooler; cooled to precipitate a portion of the salts contained therein, with the cooled brine returned to the conditioner; treated by reverse osmosis to recover clean water and concentrate the conditioner condensate, etc.; or some combination thereof. A byproduct consisting mostly of ammonium sulfate, with some ammonium chloride and other salts, will be recovered for sale or disposal.

EXAMPLES

Simplified experiments were performed to validate the concepts contained herein. Inorganic compounds significant to the chemical system consisting of kiln dust, kiln exit gases, and water are shown in Table 2. Other compounds present can be considered inert and not of significance here.

Example 1

A simplified "dust" was investigated in a sulfate/water system. In ordinary cement kiln dust, $K_2SO_4$ constitutes the bulk of the readily soluble material, while free CaO is the most active constituent. Uncalcined raw mix is essentially inert in water, while clinker compounds are significantly less reactive than free CaO and less soluble than $K_2SO_4$. This simplified system permits ready identification of precipitates in the system by eliminating interferences caused by other compounds which are ordinarily present in actual kiln dust.

Tests were conducted using $K_2SO_4$ solutions of various concentrations between 2 and 25 grams per liter (g/l) to which were added varying amounts of CaO, between 0 and 50 g/l. The resulting mixtures were allowed to stand for varying periods of time from 10 minutes to 18 hours and at various temperatures from 20° to 100° C. After 18 hours of standing, the results indicated that relatively weak solutions of $K_2SO_4$ (e.g. 2.8 g/l) retained $Ca(OH)_2$ as the solid phase, while stronger solutions (e.g. 22 g/l $K_2SO_4$) had $CaSO_4.2 H_2O$ as the solid. Shorter term tests showed $Ca(OH)_2$, $K_2Ca(SO_4).H_2O$, $CaSO_4 \frac{1}{2} H_2O$, and $CaSO_4.2 H_2O$. It was noted in several tests that a minor film of $CaCO_3$ formed at the solution interface by the reaction between dissolved calcium and atmospheric $CO_2$. These tests indicated that, when the simplified "dust" is treated with water to remove alkalies, the alkali sulfate solution will react with the available lime to precipitate slightly soluble calcium sulfate compounds. Of particular note is the presence of $K_2Ca(SO_4)_2.H_2O$ [syngenite] which will tend to increase retained alkali as well as sulfate in the solids.

TABLE 2

CHEMICAL SPECIES SIGNIFICANT TO CKD
(from: "Physical Constants of Inorganic Compounds";
CRC Handbook of Chemistry and Physics 73rd Edition; 1992–93)

| SPECIES | SOLUBILITY (g/l) | |
|---|---|---|
| | Cold | Hot |
| $NH_4OH$ | s | — |
| $NH_2Cl$ | 297 | 758 |
| $(NH_4)_2SO_4$ | 706 | 1038 |
| $(NH_4)HSO_4$ | 1000 | vs |
| $(NH_4)_2CO_3 \cdot H_2O$ | 1000 | d |
| $NH_4HCO_3$ | 119 | d |
| KOH | 1070 | 1280 |
| KCl | 344 | 567 |
| $KCl \cdot CaCl_2$ | s | — |
| $K_2SO_4$ | 120 | 241 |
| $3K_2SO_4 \cdot Na_2SO_4$ | s | s |
| $K_2Ca(SO_4)_2 \cdot H_2O$ | 2.5 | d |
| $K_2CO_3$ | 1120 | 1560 |
| $KHCO_3$ | 224 | 600 |
| $Ca(OH)_2$ | 1.85 | 0.77 |
| $CaCl_2$ | 745 | 1590 |
| $CaSO_4$ | 2.09 | 1.62 |
| $CaSO_4 \cdot \frac{1}{2}H_2O$ | 3 | sl. s |
| $CaSO_4 \cdot 2H_2O$ | 2.41 | 2.22 |
| $CaCO_3$ | 0.014 | 0.018 |
| NaOH | 420 | 3470 |
| NaCl | 357 | 391.2 |
| $Na_2SO_4$ | 47.6 | 427. |
| $Na_2Ca(SO_4)_2 \cdot 2H_2O$ | d | d |
| $Na_2CO_3$ | 71 | 455 |
| $NaHCO_3$ | 69 | 164 |

Calcium langbeinite $[K_2Ca_2(SO_4)_3]$ converts to $K_2Ca(SO_4)_2 \cdot H_2O$ + $CaSO_4 \cdot 2H_2O$ in water.
d = decomposes; s = soluble; sl. s = slightly soluble; vs = very soluble

Example 2

When carbon dioxide ($CO_2$) was added to the systems in Example 1 in the temperature range of 20° C. to 100° C., calcium carbonate ($CaCO_3$) precipitated. Since $CaCO_3$ is two orders of magnitude less soluble than the calcium sulfates (0.01 to 0.02 g/l as opposed to 2 to 3 g/l), the calcium is effectively tied up, thereby freeing alkalies and sulfate to the solution. This result is in contrast to the result in the $CO_2$-free system, where various calcium compounds precipitate, including $K_2Ca(SO_4)_2 \cdot H_2O$.

X-ray diffraction identification of the precipitated solids showed $Ca(OH)_2$, $K_2Ca(SO_4)_2 \cdot H_2O$, $CaSO_4 \cdot 2 H_2O$, and $CaSO_4 \cdot \frac{1}{2}H_2O$ when the system was not carbonated. When the system was fully carbonated, $CaCO_3$ was essentially the only solid phase present. Samples of solids taken in progression during carbonation showed that early precipitated sulfate phases, including $K_2Ca(SO_4)_2 \cdot H_2O$, redissolve as $CaCO_3$ precipitates causing a reduction in the concentration of calcium ion in solution. This, depending on reaction kinetics, has the effect of increasing the solubility of the alkali sulfates by redissolving and/or preventing precipitation of the alkali-calcium double salts.

Analyses of calcium in solution showed that the concentration of calcium decreased to a minimum and then increased as carbonation progressed (see FIG. 3). At 23° C., this minimum occurred at pH 9.5 which represents the point at which $CO_3^-$ is the only alkalinity anion in solution. Calcium concentration in solution at this point was shown to be less than 0.01 g/l. At higher pH, namely above a pH of 9.5, both $CO_3^-$ and $OH^-$ were present while, at lower pH, namely below 9.5, $HCO_{3-}$ was present in addition to $CO_3^-$. As the concentration of either $OH^-$ or $HCO_3^-$ increased, the concentration of $Ca^{++}$ in solution also increased since both the hydroxide and the bicarbonate are more soluble than the carbonate. At higher temperatures, the point of minimum solubility of calcium progressively shifted to higher pH and higher calcium concentration; e.g., at 50° C. the minimum solubility was 0.03 g/l CaO at a pH of 9.9, and at 75° C. the minimum solubility was 0.2 g/l at a pH of 10.3. Since calcium carbonate is so slightly soluble, since alkali ions do not readily fit into the $CaCO_3$ crystal structure, and since alkali carbonates are highly soluble, the effect of carbonation is to tie up calcium as carbonate, thereby preventing formation of calcium and alkali-calcium sulfates and effectively enhancing the solubility of alkali sulfates. The point of minimum calcium concentration in solution shifts to higher pH at higher temperatures.

Example 3

In order to determine the optimum amount of carbonation to which an actual kiln dust should be subjected prior to separating the slurry into solids and brine, a series of tests were run. One test slurry composed of one part dust and five parts water was maintained at a temperature of 23° C., $CO_2$ was bubbled continuously therethrough, and the concentration of dissolved CaO in g/l of solution was measured. Results of this test are shown in FIG. 4. The line above pH of 9.5 represents a curve derived from that test. The line between pH of 7.5 and 9.5 is derived from a similar test with a dust-to-water ratio of 1 part dust to 3 parts water and maintained at a temperature of 23° C. The results are in accord with well-known solubility and alkalinity data. It is evident that a minimum solubility of CaO occurs at pH 9.5 at 23° C. At pH above 9.5, under-carbonation exists with the presence of $OH^-$ ions, while at a pH below 9.5 over-carbonation exists with the presence of $HCO_3^-$ ions.

It was further observed as carbonation progressed that the slurry became thinner and more fluid, indicating that, as calcium carbonate formed from calcium hydroxide, the water thus released increased the fluidity of the slurry, while the formation of calcium carbonate apparently decreased the surface area of the solids.

Alternative Embodiment(s)

If a wet process is being used, the water content of the solids is adjusted [at 31] by increasing it to be nearly the same as that of the slurry into which it will be introduced, usually about 32 to 35% water. If a dry process is being used, the damp solids (water content 10 to 20% depending on temperature of the process) may be mixed directly with dry kiln feed, via a mixing screw or other device, in a ratio appropriate to the proportions of the two material streams, e.g. 5 to 15% dust to 95 to 85% new kiln feed, which would increase kiln feed moisture by no more that 1 to 2%. Alternatively, the solids may be introduced directly to the kiln via the kiln feed system. In other applications, the damp solids may be introduced to the raw mill for more thorough mixing and blending. In a raw mill that is in-line with the kiln exhaust gas flow, as occurs with many preheater and precalciner kilns, the water in the returned solids can substitute for conditioning water that otherwise would have to be introduced to lower exit gas temperature. In many cases, the kiln dust solids reintroduced to the process will be virtually indistinguishable from virgin kiln feed.

As an alternative to conditioning only as much kiln exit gas as required for processing of kiln dust, larger amounts of the gas can be conditioned, including up to all of it (see FIG. 2). In this case, a separate return (bypass) duct [43] is included to return excess conditioned gas (not needed for dust processing) to the normal exhaust system. A control damper [44] (actuated by ratio controller [5], pH controller [14a], damper controller [14], or a combination thereof) is included to adjust the proportions of gases used for processing of dust and of gases vented after conditioning. With additional gases being conditioned, the sizing of the conditioner and condensate treatment system [19 through 24] would have to be modified accordingly.

Conclusions, Ramifications, and Scope

Although this invention has been described in terms of certain aspects and embodiments thereof, it will be apparent to those skilled in the art that changes and modifications may be made thereto which fall within the scope of the claims.

It will be obvious to anyone skilled in the art that many variations in arrangements and exact processing steps and equipment are possible while remaining within the intent of the concepts described herein. All such variations are intended to be included within the scope of the invention, even though description of each and every possibility cannot be included.

It will also be obvious to anyone skilled in the art that the treated and conditioned kiln dust need not actually be returned to a clinker-making process but can be diverted to other purposes. It will further by obvious to anyone skilled in the art that the brine and the condensate generated by the process may have direct use as chemical feedstock or be put to end use, such as for crop fertilization, without evaporation.

General References

Haynes, Benjamin W. and Kramer, Gary W., "Characterizations of US Cement Kiln Dust," US Bureau of Mines Information Circular 8885, 1982.
US EPA, "Emission Factors for Industrial Processes," EPA publication AP-42 (various dates).
Portland Cement Association, "US and Canadian Portland Cement Industry: Plant Information Summary, December 1995"; PCA, Skokie, Ill., November 1996.
US EPA, "Development Document for Effluent Limitations Guidelines and New Source Performance Standards for the Cement Manufacturing Category," EPA-4401-74-005-a, January, 1974.
"Physical Constants of Inorganic Compounds"; CRC Handbook of Chemistry and Physics, 73rd Edition; 1992–93.

I claim:

1. A method for treating cement kiln dust for return to the cement-making process, such method consisting of:
    a. mixing kiln dust with water such that the ratio of dust to water is greater than 1:5;
    b. treating the mixture with carbon dioxide;
    c. controlling the amount of carbonation, using pH of the slurry, to maximize retention of calcium in the kiln dust solids and to maximize dissolution and removal of alkalies and sulfate;
    d. separating the resulting slurry into moist solids and brine;
    e. washing the solids with water to remove interstitial brine;
    f. recycling the wash water to the process;
    g. returning the solids to the cement-making process as kiln feed; and
    h. treating the separated brine for recovery of byproduct alkalies by direct use of the brine; by concentration of the brine by evaporation or reverse osmosis; or by recovery of salts by precipitation, evaporation, or crystallization.

2. The method of claim 1 wherein the dust to water ratio is between 2:1 and 4:1.

3. The method of claim 1 wherein the treatment occurs at a temperature between 20° C. and 95° C.

4. The method of claim 1 wherein the separation into moist solids and brine occurs at a pH above 8 and but not above 11.

5. The method of claim 1 wherein the separation into moist solids and brine occurs at a pH between 9.5 and 10.5.

6. The method of claims 3 and 5 in which the pH at which separation occurs is determined by measuring the pH at which calcium, hydroxyl, and bicarbonate ions in solution are near minimum for the specific dust being treated and the temperature of processing; this is optimum pH.

7. The method of claim 6 wherein the separation into solids and brine occurs as soon as the optimum pH is achieved.

8. The method of claim 1 wherein the washing occurs with only enough water to displace the interstitial fluid.

9. The method of claim 8 in which a multiplicity of washing steps are used.

10. The method of claim 9 in which the displaced interstitial fluid from a stage of washing other than the first is used as displacement fluid in a preceding stage of washing.

11. The method of claim 1 in which the source of carbon dioxide is kiln exit gases.

12. The method of claim 11 in which the kiln exit gases are conditioned to condense excess water and to remove contaminants that may adversely affect removal of alkalies and hinder recovery of valuable byproducts from the brine separated from the kiln dust solids.

13. The method of claim 11 in which the condensate from kiln gas conditioning is treated to recover valuable byproducts by direct use of the condensate; by concentration of the condensate by evaporation or reverse osmosis; or by recovery of salts by precipitation, evaporation, or crystallization.

14. The method of claim 13 in which the condensate is evaporated by treatment with dry vent gases from the clinker cooler.

15. The method of claim 1 in which the separated brine is treated to recover valuable byproducts by recovery of salts by precipitation, evaporation, or crystallization.

16. The method of claim 15 in which the separated brine is evaporated by treatment with dry vent gases from the clinker cooler.

17. A method for treating cement kiln dust for return to the cement-making process, such method consisting of:
    a. mixing kiln dust with water such that the ratio of dust to water is between 2:1 and 4:1;
    b. treating the mixture with carbon dioxide;
    c. controlling the amount of carbonation, using pH of the slurry, to maximize retention of calcium in the kiln dust solids and to maximize dissolution and removal of alkalies and sulfate;
    d. using pH as a measure of degree of carbonation;
    e. separating the resulting slurry into moist solids and brine;
    f. washing the solids with water to remove interstitial brine;
    g. recycling the wash water to the process;
    h. returning the solids to the cement-making process as kiln feed; and
    i. treating the separated brine for recovery of byproduct alkalies by direct use of the brine; by concentration of the brine by evaporation or reverse osmosis; or by recovery of salts by precipitation, evaporation, or crystallization.

18. The method of claim 17 in which the pH at which separation occurs is determined by measuring the pH at which calcium, hydroxyl, and bicarbonate ions in solution are near minimum for the specific dust being treated and the temperature of processing.

19. The method of claim 18 wherein the separation occurs as soon as the optimum pH is achieved.

* * * * *